(12) United States Patent
Mizutani et al.

(10) Patent No.: US 11,189,169 B2
(45) Date of Patent: *Nov. 30, 2021

(54) SERVER AND INFORMATION PROVIDING METHOD

(71) Applicant: TOYOTA JIDOSHA KABUSHIKI KAISHA, Toyota (JP)

(72) Inventors: Atsushi Mizutani, Toyota (JP); Daiki Kaneichi, Nisshin (JP); Hirotaka Karube, Toyota (JP); Jun Kondo, Nisshin (JP); Kenichi Komuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,863

(22) Filed: Mar. 2, 2020

(65) Prior Publication Data

US 2020/0202717 A1    Jun. 25, 2020

Related U.S. Application Data

(63) Continuation of application No. 16/175,421, filed on Oct. 30, 2018, now Pat. No. 10,614,712.

(30) Foreign Application Priority Data

Nov. 1, 2017    (JP) .............................. JP2017-212084

(51) Int. Cl.
    *G08G 1/14*     (2006.01)
    *G01C 21/34*    (2006.01)
    (Continued)

(52) U.S. Cl.
    CPC ......... *G08G 1/146* (2013.01); *G01C 21/3438* (2013.01); *G01C 21/3685* (2013.01);
    (Continued)

(58) Field of Classification Search
    CPC ........ G08G 1/146; G08G 1/148; G08G 1/143;
                G01C 21/3685; G01C 21/3438;
    (Continued)

(56) References Cited

U.S. PATENT DOCUMENTS

| 10,614,712 B2* | 4/2020 | Mizutani ................ G08G 1/143 |
| 2011/0025267 A1 | 2/2011 | Kamen et al. |
| 2013/0110296 A1 | 5/2013 | Khoo et al. |
| 2013/0204471 A1 | 8/2013 | O'Connell et al. |

(Continued)

FOREIGN PATENT DOCUMENTS

| JP | 2007148671 A | 6/2007 |
| JP | 2012026768 A | 2/2012 |

(Continued)

*Primary Examiner* — Anh V La
(74) *Attorney, Agent, or Firm* — Hunton Andrews Kurth LLP

(57) ABSTRACT

The server is configured to communicate with a plurality of power-supplying vehicles and a plurality of power-receiving vehicles. The server is configured to notify, to matched vehicles (candidate power-receiving vehicle and candidate power-supplying vehicle), a candidate gathering location list including respective pieces of information of a plurality of parking areas owned by third parties different from users of the matched vehicles, so as to make an inquiry to the users of the matched vehicles to select one of the plurality of parking areas included in the candidate gathering location list. The server is configured to determine a gathering location for the matched vehicles using the respective pieces of information of the parking areas selected by the users of the matched vehicles, and is configured to transmit the information of the parking area of the determined gathering location to the matched vehicles.

20 Claims, 8 Drawing Sheets

(51) Int. Cl.
*G06Q 30/02* (2012.01)
*G01C 21/36* (2006.01)
*H02J 7/00* (2006.01)
*H02J 7/34* (2006.01)

(52) U.S. Cl.
CPC ......... *G06Q 30/0265* (2013.01); *G08G 1/143* (2013.01); *G08G 1/148* (2013.01); *H02J 7/0013* (2013.01); *H02J 7/0027* (2013.01); *H02J 7/00036* (2020.01); *H02J 7/0047* (2013.01); *H02J 7/342* (2020.01)

(58) Field of Classification Search
CPC . G06Q 30/0265; Y02T 90/14; Y02T 10/7072; Y02T 10/70; H02J 7/00047; H02J 7/0013; H02J 7/00036; H02J 7/342; H02J 7/0027; H02J 7/0047; H02J 2310/48
USPC .................. 340/932.2, 933, 988, 990; 701/22
See application file for complete search history.

(56) References Cited

U.S. PATENT DOCUMENTS

| | | |
|---|---|---|
| 2014/0188318 A1 | 7/2014 | Langgood et al. |
| 2014/0214321 A1* | 7/2014 | Kawamata ......... G01C 21/3469 701/533 |
| 2015/0306967 A1* | 10/2015 | Cohen ................. H02J 7/00047 701/32.3 |
| 2016/0273927 A1* | 9/2016 | Kitajima ............... B60L 53/665 |
| 2017/0282736 A1* | 10/2017 | Goei ..................... B60L 53/665 |
| 2018/0158150 A1* | 6/2018 | Li ...................... G06Q 30/0283 |
| 2018/0281612 A1 | 10/2018 | Perry et al. |
| 2019/0001833 A1 | 1/2019 | Coburn et al. |
| 2019/0130751 A1 | 5/2019 | Mizutani et al. |

FOREIGN PATENT DOCUMENTS

| | | |
|---|---|---|
| JP | 2013192285 A | 9/2013 |
| WO | 2012/160665 A1 | 11/2012 |
| WO | 2013/061410 A1 | 5/2013 |

\* cited by examiner

FIG.8

CANDIDATE GATHERING LOCATION LIST

| PARKING AREA | DISTANCE TO PARKING AREA | UTILIZATION FEE | CLASSIFICATION | TYPE OF BUSINESS | COUPON INFORMATION |
|---|---|---|---|---|---|
| A | POWER-RECEIVING VEHICLE: L1 (km)<br>POWER-SUPPLYING VEHICLE: L2 (km) | FREE | COMMERCIAL FACILITY | SHOPPING CENTER (LARGE-SIZED) | DISCOUNT FOR ALL MERCHANDISE, FOOD AND DRINK (XX % OFF) |
| B | POWER-RECEIVING VEHICLE: L3 (km)<br>POWER-SUPPLYING VEHICLE: L4 (km) | FREE | COMMERCIAL FACILITY | FAST FOOD (SMALL-SIZED) | ONE DRINK FREE |
| C | POWER-RECEIVING VEHICLE: L5 (km)<br>POWER-SUPPLYING VEHICLE: L6 (km) | ○○ JPY/HOUR | COMMERCIAL FACILITY | CONVENIENCE STORE (SMALL-SIZED) | FIRST ONE HOUR FREE |
| D | POWER-RECEIVING VEHICLE: L7 (km)<br>POWER-SUPPLYING VEHICLE: L8 (km) | △△ JPY/HOUR | INDIVIDUAL PERSON | — | — |

SERVER AND INFORMATION PROVIDING METHOD

This is a continuation application of U.S. patent application Ser. No. 16/175,421, filed Oct. 30, 2018, which is based on Japanese Patent Application No. 2017-212084 filed on Nov. 1, 2017, with the Japan Patent Office, the entire contents of which all are hereby incorporated by reference.

BACKGROUND

Field

The present disclosure relates to a server for providing information to an electrically powered vehicle, and an information providing method performed by the server.

Description of the Background Art

Japanese Patent Laying-Open No. 2013-192285 discloses a system that provides a service for aiding to charge an electrically powered vehicle that needs to be charged. This system includes a plurality of electrically powered vehicles each configured to exchange power with another vehicle. Among the plurality of electrically powered vehicles, a charging-requiring vehicle makes a request for supply of power thereto by simultaneously notifying the current location of the charging-requiring vehicle to an unspecified number of other vehicles around the charging-requiring vehicle. This makes it possible for a user of the charging-requiring vehicle to save time and effort in performing power-supplying negotiations with users of the other vehicles one after another.

SUMMARY

When actually performing power supplying and power receiving between two vehicles, the two vehicles need to be positioned adjacent to each other and physically connected to each other. Hence, a space to park the two vehicles with certain room is needed at a location at which the two vehicles gather. If such a location (hereinafter, also referred to as "inter-vehicle charging executable location") having a space for power supplying and power receiving between the vehicles cannot be offered, power supplying and power receiving cannot be actually performed between the two vehicles even when the two vehicles are matched using the system disclosed in Japanese Patent Laying-Open No. 2013-192285.

The present disclosure has been made to solve the above-described problem, and has an object to smoothly provide information of an inter-vehicle charging executable location to each of users of a power-supplying vehicle and a power-receiving vehicle.

(1) A server according to the present disclosure is configured to communicate with a plurality of power-supplying vehicles and a plurality of power-receiving vehicles. The server includes: a storage configured to store a location list including information of at least one of parking areas owned by at least one third party different from each of users of the plurality of power-supplying vehicles and the plurality of power-receiving vehicles; and a controller configured to match at least one of the plurality of power-supplying vehicles and at least one of the plurality of power-receiving vehicles and to transmit, to the matched vehicles, the information of the parking area included in the location list.

According to the above-described configuration, the server can notify, to the matched vehicles, the parking area owned by the third party different from the users of the matched vehicles, as an inter-vehicle charging executable location. Hence, even when each of the users of the matched vehicles cannot offer an inter-vehicle charging executable location, information of an inter-vehicle charging executable location can be smoothly provided to the matched vehicles.

(2) In a certain embodiment, the information of the parking area includes information indicating whether or not the parking area is a parking area of a commercial facility, and when the parking area is the parking area of the commercial facility, the information of the parking area includes information regarding the commercial facility.

According to the above-described configuration, each of the users of the matched vehicles can check whether or not the parking area notified from the server is a parking area of a commercial facility, and when the parking area is the parking area of the commercial facility, each of the users of the matched vehicles can check the information regarding the commercial facility (such as coupon information, business type information, and the like). Moreover, the third party can present, to each of the users of the matched vehicles, the information regarding the commercial facility owned by the third party.

(3) In a certain embodiment, the information regarding the commercial facility includes coupon information that is able to be offered by the commercial facility.

According to the above-described configuration, the third party can present the coupon information (for example, merchandise discount information or the like) of the commercial facility to each of the users of the matched vehicles. Accordingly, the third party can attract, to the commercial facility, users who are interested in the coupon information of the commercial facility of the third party.

(4) In a certain embodiment, the information regarding the commercial facility includes information of a type of business dealt with by the commercial facility.

According to the above-described configuration, the third party can present, to each of the users of the matched vehicles, the information (for example, information indicating details of merchandise or services that can be offered in the commercial facility) of the type of business dealt with by the commercial facility. Accordingly, the third party can attract, to the commercial facility, users (customer segment targeted by the commercial facility) who are interested in the type of business dealt with by the commercial facility of the third party.

(5) In a certain embodiment, the location list includes respective pieces of information of a plurality of the parking areas. The controller is configured to: notify the location list to the matched vehicles so as to make an inquiry to each of users of the matched vehicles to select one of the respective pieces of information of the plurality of parking areas included in the location list; determine a gathering location for the matched vehicles using respective pieces of information of parking areas selected by the users of the matched vehicles; and transmit information of the determined gathering location to the matched vehicles.

According to the above-described configuration, each of the users of the matched vehicles can check the respective pieces of information of the plurality of parking areas included in the location list, and then can select a desired gathering location.

(6) An information providing method according to the present disclosure is an information providing method performed by a server configured to communicate with a plurality of power-supplying vehicles and a plurality of power-receiving vehicles. The server is configured to store a location list including information of at least one of parking areas owned by at least one third party different from each of users of the plurality of power-supplying vehicles and the plurality of power-receiving vehicles. The information providing method includes: matching at least one of the plurality of power-supplying vehicles and at least one of the plurality of power-receiving vehicles; and transmitting, to the matched vehicles, the information of the parking area included in the location list.

According to the above-described configuration, the server can notify, to the matched vehicles, the parking area owned by the third party different from the users of the matched vehicles, as an inter-vehicle charging executable location. Hence, even when each of the users of the matched vehicles cannot offer an inter-vehicle charging executable location, information of an inter-vehicle charging executable location can be smoothly provided to the matched vehicles.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 shows an exemplary candidate gathering location list created by the server.

DESCRIPTION OF THE PREFERRED EMBODIMENTS

Figure 1:
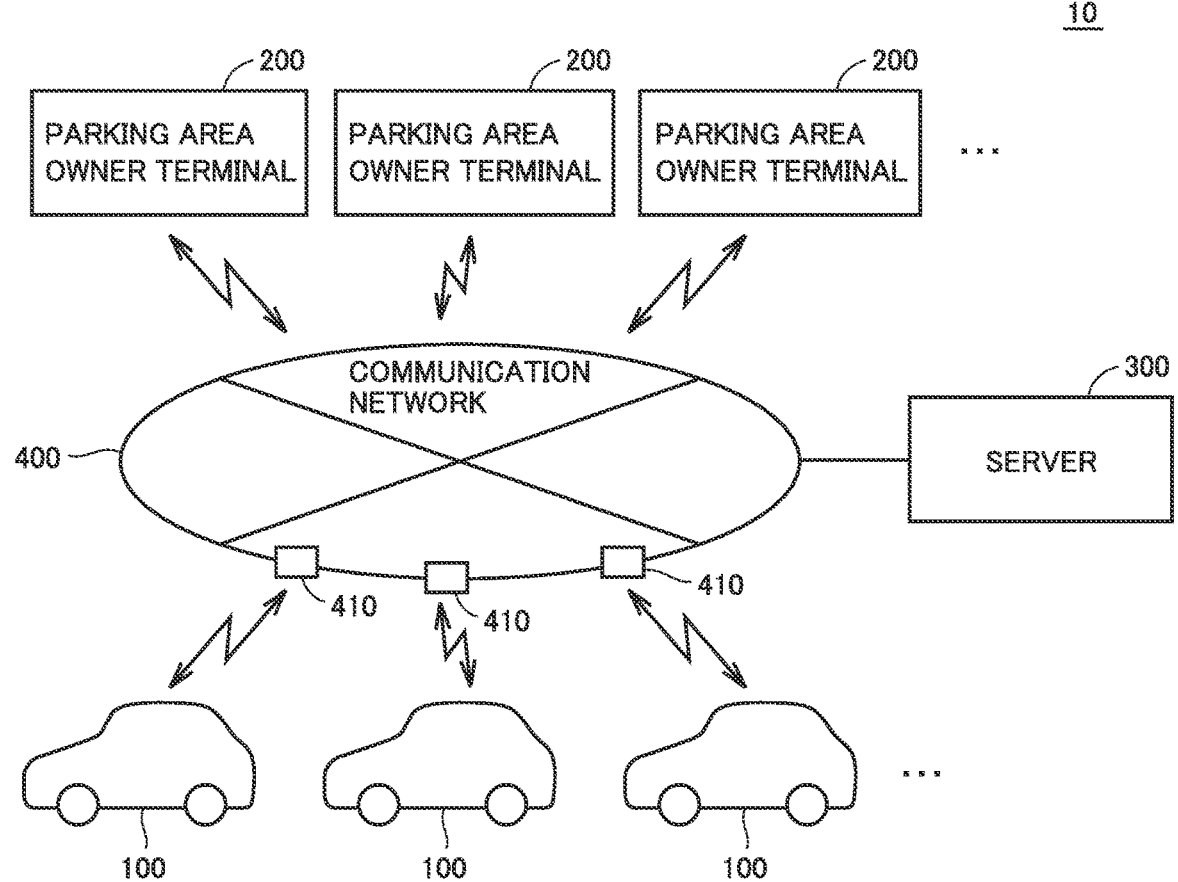
FIG. 1 schematically shows an entire configuration of an information providing system.

The following describes embodiments of the present disclosure with reference to figures in detail. It should be noted that the same or corresponding portions are given the same reference characters and are not described repeatedly.

<System Configuration>

FIG. 1 schematically shows an entire configuration of an information providing system 10 according to the present embodiment. Information providing system 10 includes a plurality of electrically powered vehicles (hereinafter, also simply referred to as "vehicles") 100, a plurality of parking area owner terminals 200, and a server 300. Each vehicle 100, each parking area owner terminal 200 and server 300 are configured to communicate with each other via a communication network 400 such as the Internet or a telephone network. It should be noted that each vehicle 100 is configured to send and receive information to and from a base station 410 of communication network 400 through wireless communication.

As described below with reference to FIG. 2, vehicle 100 is an electric vehicle (EV) configured to generate driving power for traveling using electric power from a power storage device mounted thereon and to permit charging of the power storage device using electric power supplied from a power supply external to the vehicle.

Parking area owner terminal 200 is a terminal device of an owner (hereinafter, also referred to as "parking area owner") who owns a parking area in which at least two vehicles can be parked. The parking area owners include: an individual person (natural person); a legal person that owns a commercial facility; and the like. Each parking area owner operates parking area owner terminal 200 to provide server 300 with information regarding the parking area owned by the parking area owner.

Server 300 communicates with vehicle 100 and parking area owner terminal 200 and provides various information to vehicle 100 and parking area owner terminal 200.

Figure 2:
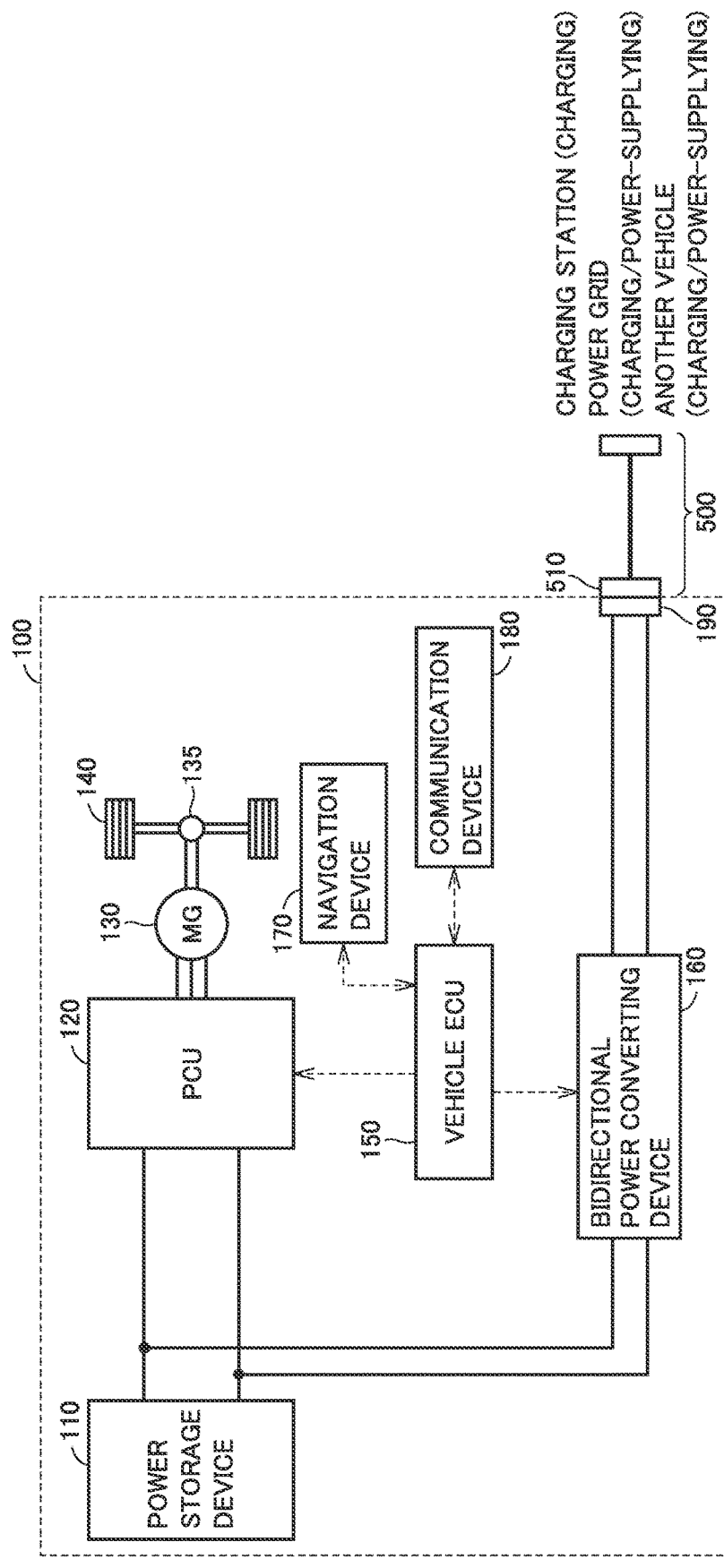
FIG. 2 shows an exemplary configuration of the vehicle.

FIG. 2 shows an exemplary configuration of vehicle 100. Vehicle 100 includes a power storage device 110, a PCU 120 serving as a driving device, a motor generator 130, a power transmitting gear 135, driving wheels 140, a vehicle ECU (Electronic Control Unit) 150, and a navigation device 170.

In vehicle 100, power storage device 110 can be charged using power supplied from a charging station or commercial power grid external to the vehicle. Moreover, vehicle 100 can output power of power storage device 110 to outside the vehicle, and can perform "inter-vehicle charging", which is charging and discharging between vehicle 100 and another vehicle.

Figure 3:
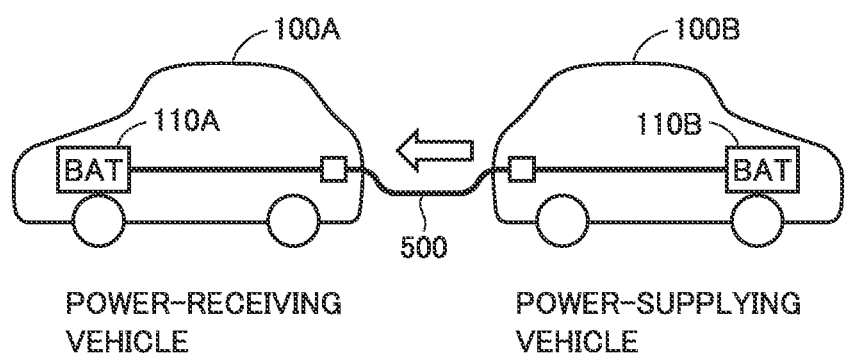
FIG. 3 illustrates inter-vehicle charging.

FIG. 3 illustrates the inter-vehicle charging. For the inter-vehicle charging, as shown in FIG. 3, a vehicle 100 (hereinafter, also referred to as "power-receiving vehicle 100A") to receive power and a vehicle 100 (hereinafter, also referred to as "power-supplying vehicle 100B") to supply power are connected to each other via a charging cable 500. Then, power is discharged from a power storage device 110B of power-supplying vehicle 100B to charge a power storage device 110A of power-receiving vehicle 100A.

Turning back to FIG. 2, power storage device 110 is configured to be charged and discharged. Power storage device 110 is configured to include a secondary battery such as a lithium ion battery or a nickel-hydrogen battery, or include a power storage element such as an electric double layer capacitor, for example.

Power storage device 110 supplies electric power to PCU 120 so as to generate driving power of vehicle 100. Further, power storage device 110 stores electric power generated by motor generator 130. Power storage device 110 outputs, to vehicle ECU 150, detection values of voltage and current of power storage device 110 detected by a sensor not shown in the figure.

PCU 120 is configured to include power converting devices such as a converter and an inverter, which are not shown in the figure. Each of the converter and the inverter is controlled by a control signal from vehicle ECU 150 to convert DC power from power storage device 110 into AC power for driving motor generator 130.

Motor generator 130 is an alternating-current rotating electrical machine, such as a permanent-magnet type synchronous motor including a rotor having a permanent magnet embedded therein. Output torque of motor generator 130 is transmitted to driving wheels 140 via power transmitting gear 135 to travel vehicle 100. Motor generator 130 is capable of generating electric power using rotation power of driving wheels 140 when vehicle 100 operates for regenerative braking. The electric power thus generated is converted by PCU 120 into charging power for power storage device 110.

Although not shown in FIG. 2, vehicle ECU 150 includes a CPU (Central Processing Unit), a storage device, and an input/output buffer, so as to receive signals from sensors, send control signals to devices, and control vehicle 100 and the devices. It should be noted that they can be controlled by not only a process performed by software but also a process performed by dedicated hardware (electronic circuit) constructed therefor.

As a configuration for charging and discharging power storage device 110, vehicle 100 further includes a bidirectional power converting device 160, a communication device 180, and an inlet 190. A charging connector 510 of charging cable 500 is connected to inlet 190. Via charging cable 500, power supplied from another vehicle is transferred to vehicle 100.

Bidirectional power converting device 160 is connected between power storage device 110 and inlet 190. Bidirectional power converting device 160 is controlled by a control signal from vehicle ECU 150 to convert power supplied from another vehicle or the like into power with which power storage device 110 can be charged. Moreover, bidirectional power converting device 160 converts power from power storage device 110 into power that can be output to outside the vehicle.

Communication device 180 is an interface for communication between vehicle ECU 150 and server 300 external to the vehicle or another vehicle. As described above, communication device 180 is configured to communicate with server 300 via communication network 400.

Figure 4:
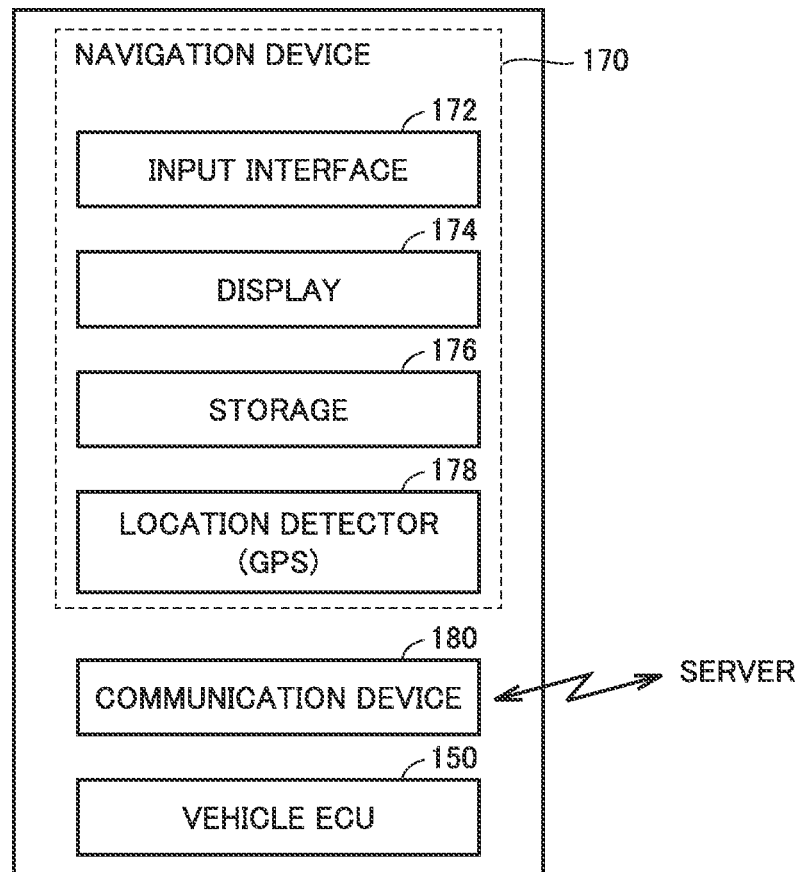
FIG. 4 is a block diagram showing a configuration in relation with a navigation device in the vehicle.

FIG. 4 is a block diagram showing a configuration in relation with navigation device 170 in vehicle 100. Navigation device 170 includes an input interface 172, a display 174, a storage 176, and a location detector 178 as shown in FIG. 4. Navigation device 170 uses map information stored in storage 176 and location information of vehicle 100 detected by GPS (Global Positioning System) of location detector 178, so as to present the current location of vehicle 100 on a map for the user and provide a navigation to a destination.

Display 174 is constructed of, for example, a liquid crystal panel and presents the current location of vehicle 100 or various information from vehicle ECU 150. Input interface 172 is constructed of a touch panel, a switch, or the like, and receives an operation by the user.

Figure 5:
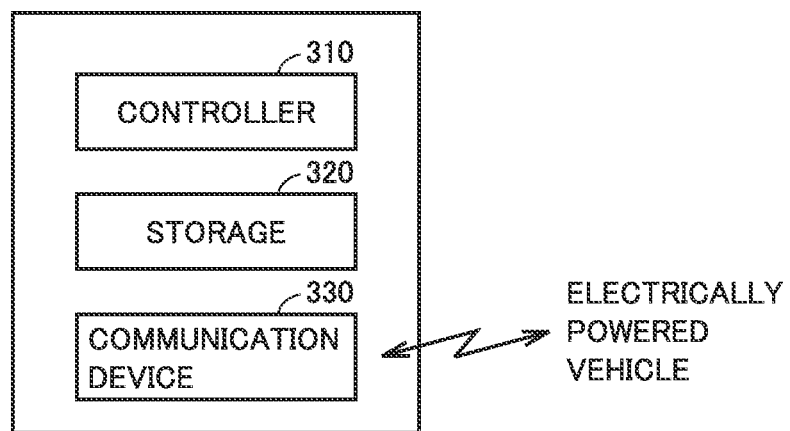
FIG. 5 is a block diagram showing a configuration of a server.

FIG. 5 is a block diagram showing a configuration of server 300. Server 300 includes a controller 310, a storage 320, and a communication device 330.

Communication device 330 is an interface for communication with vehicle 100 via communication network 400. In storage 320, the map information and the information (location information or the like) received from vehicle 100 are stored.

Based on the information received from vehicle 100 by communication device 330 and the information stored in storage 320, controller 310 performs a matching process for vehicles that are to perform inter-vehicle charging as described below.

<Matching of Vehicles that are to Perform Inter-Vehicle Charging>

As described above, vehicle 100 can perform inter-vehicle charging, which is charging and discharging between vehicle 100 and another vehicle. Therefore, when a vehicle 100 (hereinafter, also referred to as "power-receiving requesting vehicle") having a power storage device 110 with a small remaining power amount and requesting reception of power from another vehicle can be matched to a vehicle 100 (hereinafter, also referred to as "power-supplying permitted vehicle") having a power storage device 110 with a large remaining power amount and permitted to supply power to another vehicle, electric energy stored in each vehicle 100 can be utilized effectively.

However, in order to actually perform inter-vehicle charging between a power-receiving requesting vehicle and a power-supplying permitted vehicle, these vehicles need to be positioned adjacent to each other and physically connected to each other. Hence, a space to park the two vehicles with certain room is needed at a location at which the inter-vehicle charging is to be performed. If a parking area (hereinafter, also referred to as "inter-vehicle charging executable parking area") having such a space cannot be offered when server 300 matches a power-receiving requesting vehicle and a power-supplying permitted vehicle, there is no location to connect the matched vehicles physically, with the result that inter-vehicle charging cannot be performed.

In view of the above-described point, information providing system 10 according to the present embodiment provides a service for matching a power-supplying permitted vehicle and a power-receiving requesting vehicle on a map. On this occasion, for a location at which the power-supplying permitted vehicle and the power-receiving requesting vehicle are to be gathered, information providing system 10 employs a location offered from a third party (parking area owner) different from users of the matched vehicles. Hereinafter, details of this service will be described.

Figure 6:
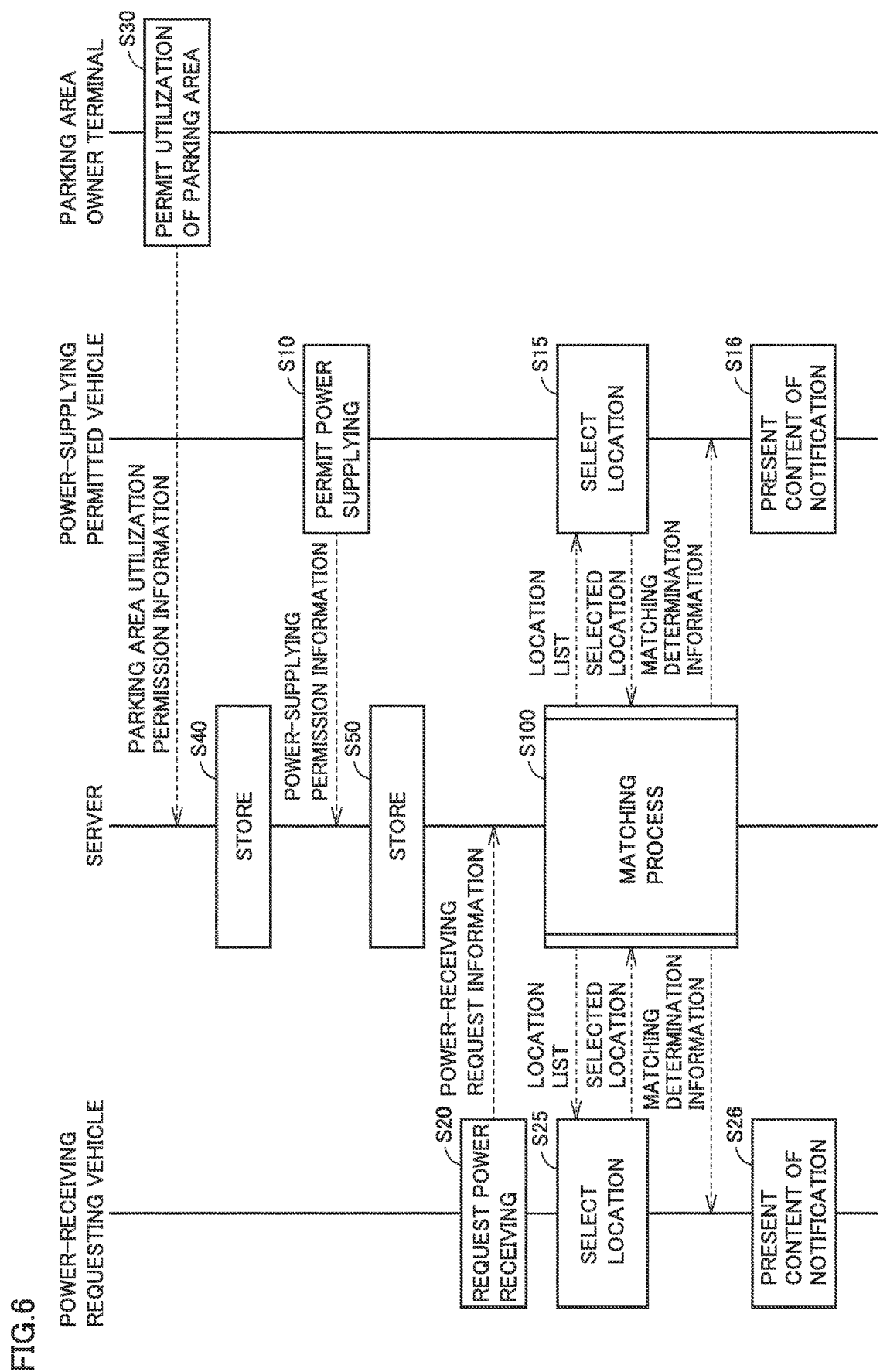
FIG. 6 is a sequence diagram showing an exemplary process performed among a power-receiving requesting vehicle, a server, a power-supplying permitted vehicle, and a parking area owner terminal.

FIG. 6 is a sequence diagram showing an exemplary process performed among a power-receiving requesting vehicle (more specifically, vehicle ECU 150 of the power-receiving requesting vehicle), server 300 (more specifically, controller 310 of server 300), a power-supplying permitted vehicle (more specifically, vehicle ECU 150 of the power-supplying permitted vehicle), and parking area owner terminal 200 included in information providing system 10. It should be noted that for simplicity of explanation, FIG. 6 illustrates one power-receiving requesting vehicle, one power-supplying permitted vehicle, and one parking area owner terminal 200; however, there may be actually a plurality of power-receiving requesting vehicles, a plurality of power-supplying permitted vehicles, and a plurality of parking area owner terminals 200.

When an inter-vehicle charging executable parking area owned by the parking area owner is permitted by the parking area owner to be utilized as a location at which inter-vehicle charging is to be performed, parking area owner terminal 200 transmits parking area utilization permission information to server 300 (step S30). The parking area utilization permission information includes: location information of the parking area permitted to be utilized; utilization fee information of the parking area; classification information indicating whether the parking area is a parking area of an individual person or a parking area of a commercial facility; business type information of the commercial facility; coupon information thereof; and the like (see FIG. 8 described below). Server 300 stores, into storage 320, the parking area utilization permission information received from parking area owner terminal 200 (step S40).

When it is permitted in the power-supplying permitted vehicle to supply power to another vehicle, the power-supplying permitted vehicle transmits power-supplying permission information to server 300 (step S10). The power-supplying permission information includes information such as the vehicle ID for specifying the power-supplying permitted vehicle, and the current location of the power-supplying permitted vehicle. Server 300 stores, into storage 320, the power-supplying permission information received from the power-supplying permitted vehicle (step S50).

In order to request to receive power from another vehicle, the power-receiving requesting vehicle transmits power-receiving request information to server 300 (step S20). The power receiving request information includes information such as the vehicle ID for specifying the power-receiving requesting vehicle and the current location of the power-receiving requesting vehicle.

When server 300 receives the power-receiving request information from the power-receiving requesting vehicle, server 300 performs a process (hereinafter, also simply referred to as "matching process") for setting the power-receiving requesting vehicle as a candidate power-receiving vehicle and setting a candidate power-supplying vehicle suitable for the candidate power-receiving vehicle so as to match the vehicles (step S100).

It should be noted that for simplicity of explanation, the following describes a case where one candidate power-receiving vehicle and one candidate power-supplying vehicle are matched through the matching process; however, a combination of vehicles to be matched is not limited to this. For example, two or more candidate power-supplying vehicles may be matched to one candidate power-receiving vehicle.

In the matching process, based on the power-receiving request information received from the candidate power-receiving vehicle and the respective pieces of stored information of a plurality of power-supplying permitted vehicles in storage 320, server 300 selects a vehicle suitable to supply power to the candidate power-receiving vehicle, from the plurality of power-supplying permitted vehicles, and sets the selected power-supplying permitted vehicle as a candidate power-supplying vehicle. This process corresponds to the process for matching a candidate power-receiving vehicle and a candidate power-supplying vehicle.

Then, using each current location of the candidate power-receiving vehicle and the candidate power-supplying vehicle and the parking area utilization permission information stored in storage 320, server 300 creates a list (hereinafter, also referred to as "candidate gathering location list") indicating candidates of locations for gathering of the candidate power-receiving vehicle and the candidate power-supplying vehicle for the purpose of inter-vehicle charging. Then, server 300 transmits the created candidate gathering location list to the candidate power-receiving vehicle and the candidate power-supplying vehicle so as to make an inquiry to each of the users of the candidate power-receiving vehicle and the candidate power-supplying vehicle to select one of the plurality of parking areas included in the candidate gathering location list.

The candidate power-supplying vehicle having received this inquiry presents, on display 174, the candidate gathering location list received from server 300, allows the user to select one of the plurality of parking areas included in the candidate gathering location list, and makes a response to server 300 by returning, to server 300, selected-location information indicating the parking area selected by the user (step S15). Likewise, the candidate power-receiving vehicle presents, on display 174, the candidate gathering location list received from server 300, allows the user to select one of the plurality of parking areas included in the candidate gathering location list, and makes a response to server 300 by returning, to server 300, selected-location information indicating the parking area selected by the user (step S25).

Server 300 determines a gathering location for the candidate power-supplying vehicle and the candidate power-receiving vehicle using the selected-location information returned from the candidate power-supplying vehicle and the selected-location information returned from the candidate power-receiving vehicle. Then, server 300 notifies, to the candidate power-supplying vehicle and the candidate power-receiving vehicle, matching determination information including the information of the candidate power-supplying vehicle and the candidate power-receiving vehicle and information of the determined gathering location.

The candidate power-receiving vehicle having received the matching determination information from server 300 presents the received content on display 174 (step S26). Likewise, the power-supplying permitted vehicle having received the matching determination information from server 300 presents the received content on display 174 (step S16). Accordingly, even when the user of each vehicle cannot offer an inter-vehicle charging executable parking area, the user of each vehicle checks the counterpart, matched vehicle and the gathering location, and moves to the gathering location so as to perform inter-vehicle charging with the counterpart, matched vehicle.

Figure 7:
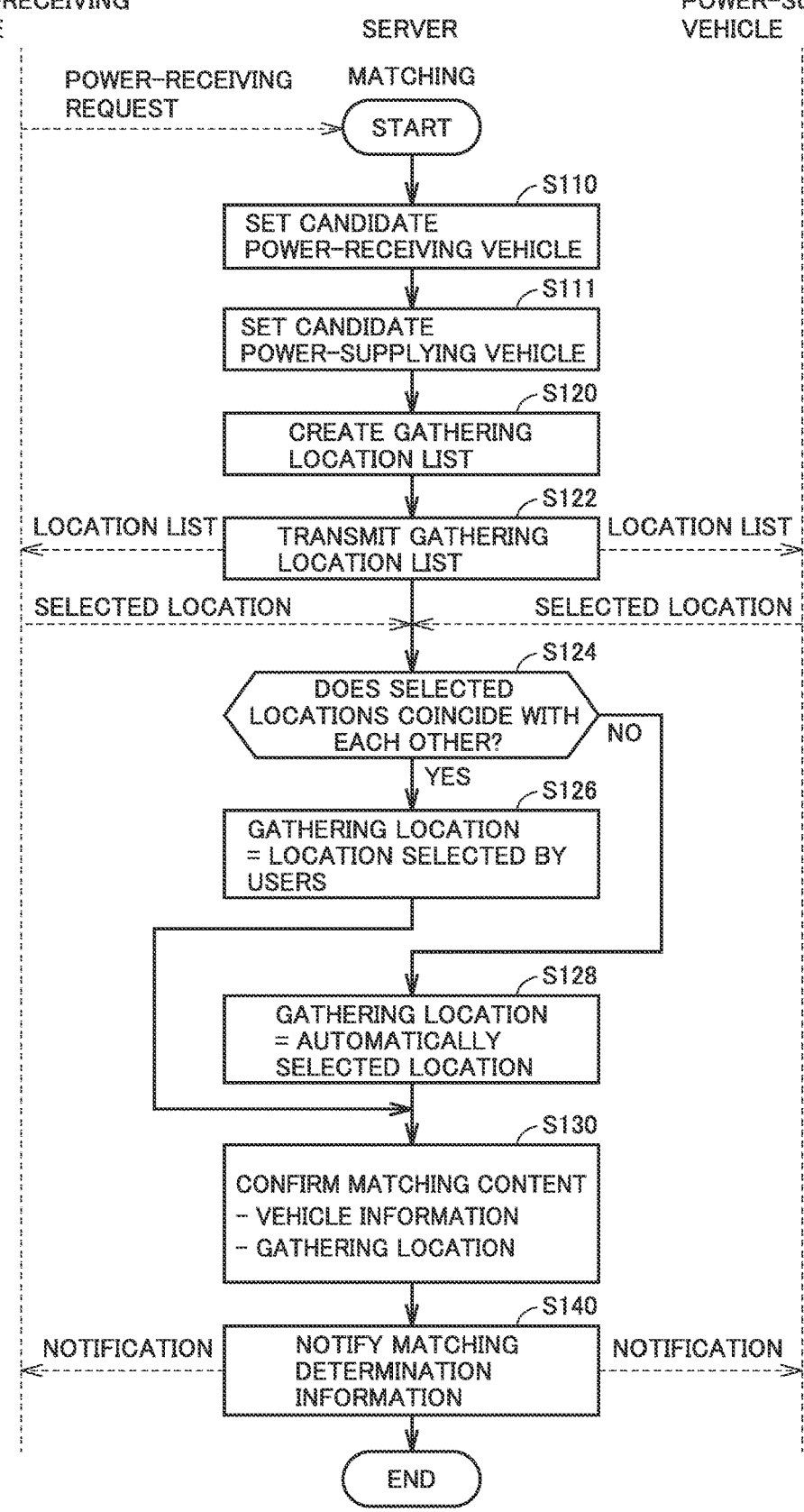
FIG. 7 is a flowchart showing an exemplary detailed procedure of a matching process performed by the server.

FIG. 7 is a flowchart showing an exemplary detailed procedure of the matching process (step S100 of FIG. 6) performed by server 300. Server 300 is triggered to start the process of this flowchart by receiving the power-receiving request information from the power-receiving requesting vehicle.

First, server 300 sets, as a candidate power-receiving vehicle, the power-receiving requesting vehicle specified by the power-receiving request information (S110).

Next, server 300 performs a process for setting a candidate power-supplying vehicle, based on the power-receiving request information received from the candidate power-receiving vehicle and respective pieces of stored power-supplying permission information of a plurality of power-supplying permitted vehicles in storage 320 (step S111). For example, from the plurality of power-supplying permitted vehicles stored in storage 320, server 300 sets, as the candidate power-supplying vehicle, a power-supplying permitted vehicle whose distance from the candidate power-receiving vehicle is less than a threshold value and whose possible power-supplying amount is the closest to the requested power-receiving amount of the candidate power-receiving vehicle.

Next, server 300 creates the candidate gathering location list using each of the current locations of the candidate power-receiving vehicle and the candidate power-supplying vehicle and the parking area utilization permission information stored in storage 320 (step S120).

FIG. 8 shows an exemplary candidate gathering location list created by server 300. The candidate gathering location list includes respective pieces of information of a plurality of parking areas owned by third parties.

The information of each parking area includes: information indicating a distance from each vehicle to the parking area; information indicating the utilization fee of the parking area; and classification information indicating whether the parking area is a parking area of an individual person or a parking area of a commercial facility. When the classification information indicates a "commercial facility", the information of the parking area further includes information regarding the commercial facility, specifically, includes: coupon information that can be offered by the commercial facility; and information of a type of business dealt with by the commercial facility.

For the parking area indicated to be a parking area of a "commercial facility" by the classification information, each of the users to perform inter-vehicle charging can be expected to utilize the commercial facility, so that the utilization fee of the parking area can be a fixed fee or free. On the other hand, for the parking area indicated to be a parking area of an "individual person" by the classification information, the utilization fee is paid to the individual person who owns the parking area, whereby balance can be kept between each user who utilizes the parking area and the third party (individual person) who offers the parking area. It should be noted that the utilization fee is supposed to be paid by the user of the power-receiving vehicle; however, the operator of information providing system 10 may pay part of or whole of the utilization fee.

In a case shown in FIG. 8, respective pieces of information of four parking areas A to D are shown. Regarding parking area A shown in FIG. 8, it is understandable that: a distance from the candidate power-receiving vehicle to parking area A is "L1 (km)"; a distance from the candidate power-supplying vehicle to parking area A is "L2 (km)"; the utilization fee is "free"; parking area A is a parking area of a "commercial facility"; the type of business of the commercial facility is a "large-sized shopping center"; and there is discount for merchandise, food and drink as coupon information of the commercial facility. The similar applies to parking area B and parking area C, which are parking areas of other commercial facilities.

On the other hand, regarding parking area D shown in FIG. 8, it is understandable that: a distance from the candidate power-receiving vehicle to parking area D is "L7 (km)"; a distance from the candidate power-supplying vehicle to parking area D is "L8 (km)"; the utilization fee of parking area D is "ΔΔ JPY/hour"; and parking area D is a parking area of an "individual person".

Turning back to FIG. 7, server 300 transmits the created candidate gathering location list to the candidate power-receiving vehicle and the candidate power-supplying vehicle so as to make an inquiry to each of the users of the candidate power-receiving vehicle and the candidate power-supplying vehicle to select one of the plurality of parking areas included in the candidate gathering location list (step S122).

When server 300 receives a response to the inquiry of step S122 from each of the candidate power-receiving vehicle and the candidate power-supplying vehicle, server 300 determines whether or not the location selected by the user of the candidate power-supplying vehicle coincides with the location selected by the user of the candidate power-receiving vehicle (step S124).

When the respective locations selected by the users coincide with each other (YES in step S124), server 300 sets the location selected by the users, as the gathering location (step S126).

On the other hand, when the respective locations selected by the users do not coincide with each other (NO in step S124), server 300 sets, as the gathering location, a location automatically selected by server 300. For example, server 300 can automatically select, as the gathering location, the location selected by the user of the candidate power-receiving vehicle that has a small remaining power amount in power storage device 110 and that can travel a short distance. It should be noted that server 300 may automatically select, as the gathering location, the location selected by the user of the candidate power-supplying vehicle.

Next, server 300 confirms the matching of the candidate power-receiving vehicle and the candidate power-supplying vehicle (step S130). Specifically, the candidate power-receiving vehicle and the candidate power-supplying vehicle are confirmed as matching target vehicles, and the gathering location set in step S126 or step S128 is confirmed as a non-provisional gathering location.

Moreover, server 300 notifies, to both the matched vehicles, the matching determination information including the information of each vehicle, the information of the gathering location, and the like (step S140).

As described above, server 300 according to the present embodiment transmits, to the matched vehicles (the candidate power-receiving vehicle and the candidate power-supplying vehicle), the information of the parking area owned by the third party different from the users of the matched vehicles. Accordingly, server 300 can notify, to the matched vehicles, the parking area owned by the third party as an inter-vehicle charging executable location. Hence, even when each of the users of the matched vehicles cannot offer an inter-vehicle charging executable location, information of an inter-vehicle charging executable location can be smoothly provided to the matched vehicles.

In particular, server 300 according to the present embodiment notifies, to the matched vehicles, the candidate gathering location list (see FIG. 8) including the respective pieces of information of the plurality of parking areas so as to make an inquiry to the users of the matched vehicles to select one of the plurality of parking areas included in the candidate gathering location list. Then, server 300 determines the gathering location for the matched vehicles using the respective pieces of information of the parking areas selected by the users of the matched vehicles, and transmits the information of the determined gathering location to the matched vehicles. Accordingly, each of the users of the matched vehicles can check the respective pieces of information of the plurality of parking areas included in the candidate gathering location list, and then can select a desired gathering location. Moreover, the third party can attract the users of the matched vehicles to the parking area owned by the third party. Accordingly, a new business opportunity can be provided to the third party.

Further, the information of each parking area included in the candidate gathering location list includes the classification information indicating whether the parking area is a parking area of a commercial facility or a parking area of an individual person. Hence, each of the users can check whether each parking area included in the candidate gathering location list is a parking area of a commercial facility or a parking area of an individual person, and then can select a desired gathering location.

Further, the information of each parking area included in the candidate gathering location list includes coupon information (for example, merchandise discount information or the like) of a commercial facility when the parking area is a parking area of the commercial facility. Accordingly, the third party can present, to each of the users of the matched vehicles, the coupon information (for example, merchandise discount information or the like) of the commercial facility owned by the third party. Accordingly, the third party can attract, to the commercial facility, users who are interested in the coupon information of the commercial facility of the third party.

Further, the information of each parking area included in the candidate gathering location list includes information of a type of business dealt with by a commercial facility (for example, details of merchandise or services that can be offered in the commercial facility) when the parking area is a parking area of the commercial facility. Accordingly, the third party can present, to each of the users of the matched vehicles, the type of business dealt with by the commercial facility. Accordingly, the third party who owns the commercial facility can attract, to the commercial facility, users (customer segment targeted by the commercial facility) who are interested in the type of business dealt with by the commercial facility of the third party.

<Modification 1>

In the above-described embodiment, server 300 creates the candidate gathering location list using the parking area utilization permission information stored in storage 320.

However, the method of creating the candidate gathering location list is not limited to such a method. For example, the candidate gathering location list may be created using parking area utilization permission information obtained by server 300 from a plurality of parking area owner terminals 200 in real time. According to such a method, each of the users of the matched vehicles can check the information in real time. Accordingly, an information providing system more convenient for the users can be provided.

<Modification 2>

In the above-described embodiment, it has been illustratively described that server 300 presents the candidate gathering location list to each user, and allows the user to select a desire gathering location from the plurality of parking areas included in the candidate gathering location list.

However, for example, from the plurality of parking areas included in the candidate gathering location list, server 300 may automatically extract a gathering location that satisfies a condition set by each user in advance, and may determine the extracted parking area as the gathering location.

<Modification 3>

In the above-described embodiment, it has been illustratively described that each vehicle 100 is provided with communication device 180 configured to be communicatively connected to communication network 400 directly (see FIG. 4).

However, the communicative connection between each vehicle 100 and communication network 400 may be made using a mobile terminal held by the user of each vehicle 100. Specifically, each vehicle 100 may be configured to perform short distance communication with a mobile terminal held by the user and configured to be communicatively connected to communication network 400 via the mobile terminal.

<Modification 4>

In the above-described embodiment, it has been illustratively described that the power-supplying vehicle is an electric vehicle (EV) that travels using electric power. However, the power-supplying vehicle may be a plug-in hybrid vehicle that can travel using electric power as well as fuel (such as gasoline) other than electric power.

<Modification 5>

In the above-described embodiment, it has been illustratively described that server 300 notifies the information of the matched vehicles and the gathering location to the matched vehicles as the matching determination information.

However, the matching determination information notified by server 300 to the matched vehicles is not limited only to the information described above. For example, in addition to the above-described information, server 300 may transmit, to the matched vehicles, a distance from each vehicle to the gathering location, a time required by each vehicle to move to the gathering location, a gathering time, a power amount that can be supplied by the candidate power-supplying vehicle, a power-receiving amount requested by the candidate power-receiving vehicle, user information of the matched counterpart (such as contact information and the like).

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A server configured to communicate with a power-supplying vehicle and a power-receiving vehicle, the server comprising:
   a storage configured to store a location list including information of a plurality of parking areas; and
   a controller configured to:
      notify the location list to the vehicles so as to make an inquiry to each of users of the vehicles to select one of the respective pieces of information of the plurality of parking areas included in the location list,
      determine a gathering location for the vehicles using respective pieces of information of parking areas selected by the users of the vehicles, and
      transmit information of the determined gathering location to the vehicles.

2. The server according to claim 1, wherein
   the information of the parking area includes information indicating whether or not the parking area is a parking area of a commercial facility, and
   when the parking area is the parking area of the commercial facility, the information of the parking area includes information regarding the commercial facility.

3. The server according to claim 2, wherein the information regarding the commercial facility includes coupon information that is able to be offered by the commercial facility.

4. The server according to claim 2, wherein the information regarding the commercial facility includes information of a type of business dealt with by the commercial facility.

5. The server according to claim 1, wherein the information of the parking area includes information indicating a distance from the power-supplying vehicle to the parking area.

6. The server according to claim 1, wherein the information of the parking area includes information indicating a distance from the power-receiving vehicle to the parking area.

7. The server according to claim 1, wherein the information of the parking area includes information indicating the utilization fee of the parking area.

8. The server according to claim 1, wherein the information of the parking area includes information indicating whether or not the parking area is a parking area of an individual person.

9. The server according to claim 1, wherein
   when a location selected by the user of the power-supplying vehicle coincides with a location selected by the user of the power-receiving vehicle, the controller sets the location selected by the users, as the gathering location.

10. The server according to claim 1, wherein
    when a location selected by the user of the power-supplying vehicle does not coincide with a location selected by the user of the power-receiving vehicle, the controller sets, as the gathering location, a location automatically selected by the server.

11. An information providing method performed by a server configured to communicate with a power-supplying vehicle and a power-receiving vehicle, the server being configured to store a location list including information of a plurality of parking areas, the information providing method comprising:

notifying the location list to the vehicles so as to make an inquiry to each of users of the vehicles to select one of the respective pieces of information of the plurality of parking areas included in the location list, determining a gathering location for the vehicles using respective pieces of information of parking areas selected by the users of the vehicles, and transmitting information of the determined gathering location to the vehicles.

12. The information providing method according to claim 11, wherein the information of the parking area includes information indicating whether or not the parking area is a parking area of a commercial facility, and when the parking area is the parking area of the commercial facility, the information of the parking area includes information regarding the commercial facility.

13. The information providing method according to claim 12, wherein the information regarding the commercial facility includes coupon information that is able to be offered by the commercial facility.

14. The information providing method according to claim 12, wherein the information regarding the commercial facility includes information of a type of business dealt with by the commercial facility.

15. The information providing method according to claim 11, wherein the information of the parking area includes information indicating a distance from the power-supplying vehicle to the parking area.

16. The information providing method according to claim 11, wherein the information of the parking area includes information indicating a distance from the power-receiving vehicle to the parking area.

17. The information providing method according to claim 11, wherein the information of the parking area includes information indicating the utilization fee of the parking area.

18. The information providing method according to claim 11, wherein the information of the parking area includes information indicating whether or not the parking area is a parking area of an individual person.

19. The information providing method according to claim 11, wherein the information providing method further comprises:

when a location selected by the user of the power-supplying vehicle coincides with a location selected by the user of the power-receiving vehicle, setting the location selected by the users, as the gathering location.

20. The information providing method according to claim 11, wherein the information providing method further comprises:

when a location selected by the user of the power-supplying vehicle does not coincide with a location selected by the user of the power-receiving vehicle, setting, as the gathering location, a location automatically selected by the serve.

* * * * *